US011418222B2

(12) United States Patent
Peng et al.

(10) Patent No.: US 11,418,222 B2
(45) Date of Patent: Aug. 16, 2022

(54) DATA TRANSMISSION METHOD AND DEVICE FOR MULTI-RADIO FREQUENCY SYSTEM, STORAGE MEDIUM AND TERMINAL

(71) Applicant: SPREADTRUM COMMUNICATIONS (SHANGHAI) CO., LTD., Shanghai (CN)

(72) Inventors: Yexin Peng, Shanghai (CN); Xin Liu, Shanghai (CN); Chinghwa Yu, Shanghai (CN); Yantao Li, Shanghai (CN); Yanchao Xu, Shanghai (CN); Long Wang, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 17/041,823

(22) PCT Filed: Apr. 23, 2019

(86) PCT No.: PCT/CN2019/083825
§ 371 (c)(1),
(2) Date: Sep. 25, 2020

(87) PCT Pub. No.: WO2020/172981
PCT Pub. Date: Sep. 3, 2020

(65) Prior Publication Data
US 2021/0367626 A1 Nov. 25, 2021

(30) Foreign Application Priority Data
Feb. 28, 2019 (CN) .......................... 201910151158.1

(51) Int. Cl.
*H04B 1/00* (2006.01)
*H04B 7/06* (2006.01)

(52) U.S. Cl.
CPC ......... *H04B 1/0053* (2013.01); *H04B 1/0064* (2013.01); *H04B 7/0689* (2013.01); *H04B 7/0697* (2013.01)

(58) Field of Classification Search
CPC .. H04B 1/3822; H04W 4/80; H04W 56/0025; H04W 84/18; H04W 88/06
(Continued)

(56) References Cited

U.S. PATENT DOCUMENTS 10,103,425 B2  10/2018  Huang et al.
2010/0322159 A1*  12/2010  Ko ..................... H04W 74/0816
                                                               370/329
(Continued)

FOREIGN PATENT DOCUMENTS

CN    105075129 A    11/2015
CN    105207709 A    12/2015
(Continued)

OTHER PUBLICATIONS

International Search Report for International Application No. PCT/CN2019/083825; dated Nov. 26, 2019.

*Primary Examiner* — Tan H Trinh
(74) *Attorney, Agent, or Firm* — Cantor Colburn LLP (57) ABSTRACT

A data transmission method and device for a multi-radio frequency system, a storage medium and a terminal are provided. The multi-radio frequency system includes a shared radio frequency antenna and a non-shared radio frequency antenna, the shared radio frequency antenna is configured to transmit Wi-Fi data and non-Wi-Fi data, the non-shared radio frequency antenna is configured to transmit the Wi-Fi data, and the method includes: in at least a portion of a Wi-Fi time slice, if there is Wi-Fi data to be transmitted, transmitting the Wi-Fi data using the shared radio frequency antenna and the non-shared radio frequency antenna; and in a non-Wi-Fi time slice, if there is Wi-Fi data to be trans-
(Continued)

mitted, transmitting the Wi-Fi data using the non-shared radio frequency antenna. Wi-Fi transmission efficiency and performance of the multi-radio frequency system are improved, which is conducive to coexistence of different radio frequency modes.

18 Claims, 2 Drawing Sheets

(58) Field of Classification Search
USPC ...... 455/41.1, 41.2, 78, 456.1; 370/329, 336
See application file for complete search history.

(56) References Cited

U.S. PATENT DOCUMENTS

| | | | |
|---|---|---|---|
| 2014/0273884 | A1 | 9/2014 | Mantravadi et al. |
| 2015/0264520 | A1* | 9/2015 | Beauregard ........... H04W 64/00 |
| | | | 455/456.1 |
| 2016/0119797 | A1 | 4/2016 | Das et al. |
| 2016/0119942 | A1* | 4/2016 | Wang ................ H04W 72/1215 |
| | | | 370/336 |
| 2016/0294464 | A1* | 10/2016 | HomChaudhuri ... H04B 7/0825 |
| 2016/0380666 | A1* | 12/2016 | Xue ....................... H04B 1/525 |
| | | | 455/78 |
| 2017/0033829 | A1* | 2/2017 | HomChaudhuri ..... H04B 1/401 |
| 2017/0163333 | A1* | 6/2017 | Breiling ............. H04B 7/15592 |
| 2017/0347373 | A1* | 11/2017 | Vig ..................... H04W 74/002 |
| 2018/0199148 | A1 | 7/2018 | Park et al. |
| 2018/0213541 | A1* | 7/2018 | Riess ..................... H01Q 21/30 |
| 2019/0045454 | A1* | 2/2019 | Haran ..................... H04L 5/001 |
| 2020/0235611 | A1* | 7/2020 | Zeine ..................... H02J 7/02 |
| 2020/0296726 | A1* | 9/2020 | Wu ................... H04W 72/0453 |
| 2021/0022135 | A1* | 1/2021 | Peng ..................... H04W 72/12 |

FOREIGN PATENT DOCUMENTS

| | | |
|---|---|---|
| CN | 106856589 A | 6/2017 |
| CN | 106888457 A | 6/2017 |
| CN | 108282193 A | 7/2018 |
| CN | 108668290 A | 10/2018 |
| WO | 2009095815 A2 | 8/2009 |

* cited by examiner

S101 in at least a portion of a Wi-Fi time slice, if there is Wi-Fi data to be transmitted, transmitting the Wi-Fi data using the shared radio frequency antenna and the non-shared radio frequency antenna S102 in a non-Wi-Fi time slice, if there is Wi-Fi data to be transmitted, transmitting the Wi-Fi data using the non-shared radio frequency antenna

DATA TRANSMISSION METHOD AND DEVICE FOR MULTI-RADIO FREQUENCY SYSTEM, STORAGE MEDIUM AND TERMINAL

CROSS-REFERENCE TO RELATED APPLICATIONS

This is the national stage of International Application No. PCT/C2019/083825, filed on Apr. 23, 2019. Priority under 35 U.S.C. § 119(a) and 35 U.S.C. § 365(b) is claimed from Chinese Patent Application No. 201910151158.1, filed on Feb. 28, 2019, and entitled "DATA TRANSMISSION METHOD AND DEVICE FOR MULTI-RADIO FREQUENCY SYSTEM, STORAGE MEDIUM AND TERMINAL", the entire disclosure of which is also incorporated herein by reference.

TECHNICAL FIELD

The present disclosure generally relates to communication technology field, and more particularly, to a data transmission method and device for a multi-radio frequency system, a storage medium and a terminal.

BACKGROUND

An existing device that supports 2.4 GHz band Wireless Fidelity (Wi-Fi) with Multiple Input Multiple Output (MIMO) for two spatial streams usually has two Radio Frequency (RF) antennas (also referred to as antennas). To reduce cost and power consumption, one of the two RF antennas is shared with a Long Term Evolution (LTE) RF system. Generally, on the shared RF antenna, Wi-Fi data packets and LTE data packets cannot be transmitted or received simultaneously.

Existing solutions for solving the above problem still have shortcomings, and further study is needed.

SUMMARY

Embodiments of the present disclosure guarantee performance of a multi-radio frequency system when Wi-Fi and Non-Wi-Fi in the multi-radio frequency system supporting MIMO use a shared RF antenna.

Embodiments of the present disclosure provide a data transmission method for a multi-radio frequency system, wherein the multi-radio frequency system includes a shared RF antenna and a non-shared RF antenna, the shared RF antenna is configured to transmit Wi-Fi data and non-Wi-Fi data, the non-shared RF antenna is configured to transmit the Wi-Fi data, and the method includes: in at least a portion of a Wi-Fi time slice, if there is Wi-Fi data to be transmitted, transmitting the Wi-Fi data using the shared RF antenna and the non-shared RF antenna; and in a non-Wi-Fi time slice, if there is Wi-Fi data to be transmitted, transmitting the Wi-Fi data using the non-shared RF antenna.

Optionally, before transmitting the Wi-Fi data using the shared RF antenna and the non-shared RF antenna, the method further includes: generating an antenna transmission indication message, where the antenna transmission indication message indicates transmitting the Wi-Fi data using the shared RF antenna and the non-shared RF antenna in at least the portion of the Wi-Fi time slice; and sending the antenna transmission indication message, so that a receiving device receives the Wi-Fi data using the shared RF antenna and non-shared RF antenna indicated in the antenna transmission indication message.

Optionally, before transmitting the Wi-Fi data using the non-shared RF antenna, the method further includes: generating an antenna transmission indication message, where the antenna transmission indication message indicates transmitting the Wi-Fi data using the non-shared RF antenna in the non-Wi-Fi time slice; and sending the antenna transmission indication message, so that a receiving device receives the Wi-Fi data using the non-shared RF antenna indicated in the antenna transmission indication message.

Optionally, sending the antenna transmission indication message includes: sending the antenna transmission indication message using the non-shared RF antenna.

Optionally, RF antennas of the multi-radio frequency system and the receiving device are in compliance with Institute of Electrical and Electronics Engineers (IEEE) 802.11n protocol specifications, and the antenna transmission indication message is transmitted through a Spatial Multiplexing Power Save (SMPS) management packet.

Optionally, RF antennas of the multi-radio frequency system and the receiving device are in compliance with IEEE 802.11ac protocol specifications, and the antenna transmission indication message is transmitted through an Operation Mode Notification (OPMN) management packet.

Optionally, RF antennas of the multi-radio frequency system and the receiving device are in compliance with IEEE 802.11ax protocol specifications, and the antenna transmission indication message is transmitted through a Transmission Operation Mode Indication (TOMI) management packet and/or a Receive Operation Mode Indication (ROMI) management packet.

Optionally, before transmitting the Wi-Fi data using the shared RF antenna and the non-shared RF antenna, the method further includes: determining a time slice allocation schedule, so that the at least the portion of the Wi-Fi time slice and the non-Wi-Fi time slice are determined according to the time slice allocation schedule.

Optionally, the non-shared RF antenna includes a single RF antenna, the shared RF antenna includes a single RF antenna, transmitting the Wi-Fi data using the shared RF antenna and the non-shared RF antenna includes: transmitting the Wi-Fi data using the shared RF antenna and the non-shared RF antenna based on MIMO technology, and transmitting the Wi-Fi data using the non-shared RF antenna includes: transmitting the Wi-Fi data using the non-shared RF antenna based on Single Input Single Output (SISO) technology.

Embodiments of the present disclosure further provide a data transmission device for a multi-radio frequency system, wherein the multi-radio frequency system includes a shared RF antenna and a non-shared RF antenna, the shared RF antenna is configured to transmit Wi-Fi data and non-Wi-Fi data, the non-shared RF antenna is configured to transmit the Wi-Fi data, and the data transmission device includes: a first transmission circuitry configured to: in at least a portion of a Wi-Fi time slice, if there is Wi-Fi data to be transmitted, transmit the Wi-Fi data using the shared RF antenna and the non-shared RF antenna; and a second transmission circuitry configured to: in a non-Wi-Fi time slice, if there is Wi-Fi data to be transmitted, transmit the Wi-Fi data using the non-shared RF antenna.

Embodiments of the present disclosure further provide a storage medium having computer instructions stored thereon, wherein once the computer instructions are executed, the above method is performed.

Embodiments of the present disclosure further provide a terminal including a memory and a processor, wherein the memory has computer instructions stored thereon, and once the processor executes the computer instructions, the above method is performed.

Embodiments of the present disclosure may provide following advantages.

In the embodiments of the present disclosure, a data transmission method for a multi-radio frequency system is provided, wherein the multi-radio frequency system includes a shared RF antenna and a non-shared RF antenna, the shared RF antenna is configured to transmit Wi-Fi data and non-Wi-Fi data, the non-shared RF antenna is configured to transmit the Wi-Fi data, and the method includes: in at least a portion of a Wi-Fi time slice, if there is Wi-Fi data to be transmitted, transmitting the Wi-Fi data using the shared RF antenna and the non-shared RF antenna; and in a non-Wi-Fi time slice, if there is Wi-Fi data to be transmitted, transmitting the Wi-Fi data using the non-shared RF antenna. With the solutions provided in the embodiments, in at least the portion of the Wi-Fi time slice, the shared RF antenna and the non-shared RF antenna may be used to form a MIMO antenna to transmit Wi-Fi data, and in the non-Wi-Fi time slice, the non-shared RF antenna may be used separately to transmit Wi-Fi data, thereby improving Wi-Fi transmission efficiency without affecting performance of non-Wi-Fi systems (for example, an LTE system), and further facilitating coexistence of different RF modes and improving performance of the system.

Further, before transmitting the Wi-Fi data using the shared RF antenna and the non-shared RF antenna, the method further includes: generating an antenna transmission indication message, where the antenna transmission indication message indicates transmitting the Wi-Fi data using the shared RF antenna and the non-shared RF antenna in at least the portion of the Wi-Fi time slice; and sending the antenna transmission indication message, so that a receiving device receives the Wi-Fi data using the shared RF antenna and non-shared RF antenna indicated in the antenna transmission indication message. With the solutions provided in the embodiments, a transmitting Wi-Fi device can send the antenna transmission indication message to the receiving Wi-Fi device, so that they can negotiate with each other to determine whether to use all RF antennas or merely non-shared RF antennas for data transmission, so that the transmitting Wi-Fi device and the receiving Wi-Fi device flexibly determine a working mode of the RF antenna, which further improves the Wi-Fi transmission efficiency, optimizes Wi-Fi performance, and improves the performance of the system.

Further, before transmitting the Wi-Fi data using the shared RF antenna and the non-shared RF antenna, the method further includes: determining a time slice allocation schedule, so that the at least the portion of the Wi-Fi time slice and the non-Wi-Fi time slice are determined according to the time slice allocation schedule. With the solutions provided in the embodiments, an antenna transmission mode can be agreed between the transmitting Wi-Fi device and the receiving Wi-Fi device through the time slice allocation schedule, which may reduce signaling messages that are explicitly transmitted, thereby further reducing Wi-Fi transmission overhead and improving Wi-Fi performance.

DETAILED DESCRIPTION

As described in the background, in existing techniques, when Wi-Fi shares an RF antenna with other radio technologies, there are deficiencies and improvement is needed.

The inventor of the present disclosure found through research that in the existing techniques, when Wi-Fi shares an RF antenna with other radio technologies (for example, LTE technology), it is usually difficult to transmit and receive Wi-Fi data and LTE data simultaneously on the shared RF antenna. For Wi-Fi devices that support MIMO, two or more RF antennas are required to perform MIMO transmission and reception.

In view of a coexistence problem when Wi-Fi and LTE share one antenna, exiting technical solutions mainly include two types: Packet Traffic Arbitration (PTA) and Time Division Duplex (TDD).

In a PTA solution, priorities of Wi-Fi data packets and LTE data packets are predefined. When Wi-Fi data packets and LTE data packets are transmitted or received simultaneously, arbitration is performed according to the priorities of the Wi-Fi data packets and LTE data packets, so as to determine whether to transmit or receive Wi-Fi data packets or LTE data packets, and drop LTE data packets or Wi-Fi data packets.

In practice, the priorities of the LTE data packets are generally higher than the priorities of the Wi-Fi data packets. If merely the PTA solution is used, a large number of Wi-Fi data packets will be dropped, which may seriously affect Wi-Fi performance Therefore, the PTA solution is generally suitable for scenarios where traffic exchange of Wi-Fi data packets and LTE data packets is relatively small. When Wi-Fi and other systems use a shared RF antenna to transmit data packets of different systems, the PTA solution is usually not merely used.

In a TDD solution, different time slices are allocated for Wi-Fi and LTE, so that Wi-Fi and LTE can transmit and receive data in their respective time slices. In the existing TDD solution, time slices can be strictly allocated to Wi-Fi and LTE respectively, so that Wi-Fi can merely work in Wi-Fi time slices, and Wi-Fi is not allowed to work in LTE time slices. This TDD solution is feasible when the Wi-Fi device merely supports one RF antenna to transmit data. However, when the Wi-Fi device supports two or more RF antennas for MIMO transmission, the TDD solution may make the non-shared RF antenna suitable for Wi-Fi transmission unable to work in the LTE time slice, thereby reducing Wi-Fi performance.

In the embodiments of the present disclosure, a data transmission method for a multi-radio frequency system is provided, wherein the multi-radio frequency system includes a shared RF antenna and a non-shared RF antenna, the shared RF antenna is configured to transmit Wi-Fi data and non-Wi-Fi data, the non-shared RF antenna is configured to transmit the Wi-Fi data, and the method includes: in at least a portion of a Wi-Fi time slice, if there is Wi-Fi data to be transmitted, transmitting the Wi-Fi data using the shared RF antenna and the non-shared RF antenna; and in a non-Wi-Fi time slice, if there is Wi-Fi data to be transmitted, transmitting the Wi-Fi data using the non-shared RF antenna.

With the solutions provided in the embodiments, in at least the portion of the Wi-Fi time slice, the shared RF antenna and the non-shared RF antenna may be used to form a MIMO antenna to transmit Wi-Fi data, and in the non-Wi-Fi time slice, the non-shared RF antenna may be used separately to transmit Wi-Fi data, thereby improving Wi-Fi transmission efficiency without affecting performance of non-Wi-Fi systems (for example, an LTE system), and further facilitating coexistence of different RF modes and improving performance of the system.

In order to clarify the objects, characteristics and advantages of the disclosure, embodiments of present disclosure will be described in detail in conjunction with accompanying drawings.

Figure 1:
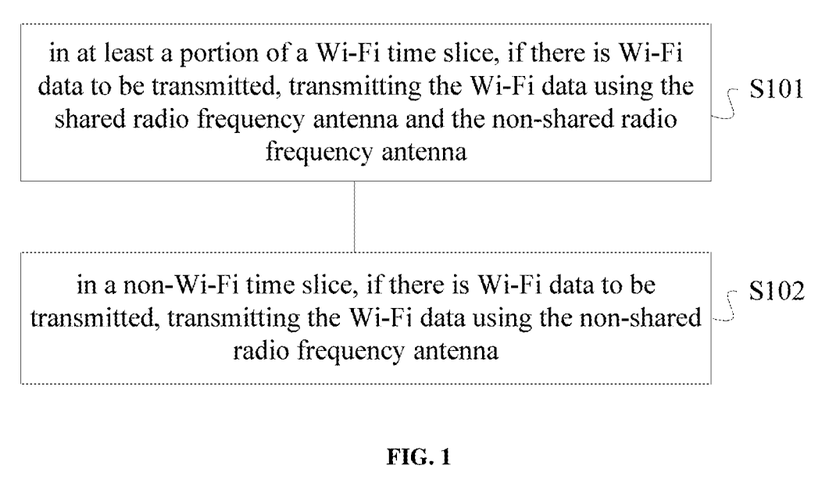
FIG. 1 is a flow chart of a data transmission method for a multi-radio frequency system according to an embodiment.

FIG. 1 is a flow chart of a data transmission method for a multi-radio frequency system. The multi-radio frequency system may reuse a same RF component to transmit Wi-Fi data and non-Wi-Fi data.

In practice, the non-Wi-Fi data may be LTE data or data of other radio access technologies. The same RF component refers to a shared RF antenna shared by Wi-Fi RF and other non-Wi-Fi radio frequency, and is referred to as a shared antenna for short.

The multi-radio frequency system may transmit Wi-Fi data and non-Wi-Fi data using TDD.

The multi-radio frequency system may use the shared RF antenna to transmit Wi-Fi data and non-Wi-Fi data, and may use the shared RF antenna and a non-shared RF antenna to transmit the Wi-Fi data within a Wi-Fi time slice.

Take the terminal being deployed in a 2.4 GHz frequency band, and the multi-radio frequency system of the terminal including two antennas as an example. The multi-radio frequency system controls the two antennas of the terminal respectively, so that the two antennas can work simultaneously or separately without affecting each other.

Specifically, the terminal includes a Wi-Fi RF system and an LTE RF system. The Wi-Fi RF system and the LTE RF system share one RF antenna. The RF antenna may be configured to be used merely by the Wi-Fi RF system, or configured to be used merely by the LTE RF systems. In addition, the Wi-Fi RF system further has one RF antenna, which is merely used by the Wi-Fi RF system.

Figure 2:
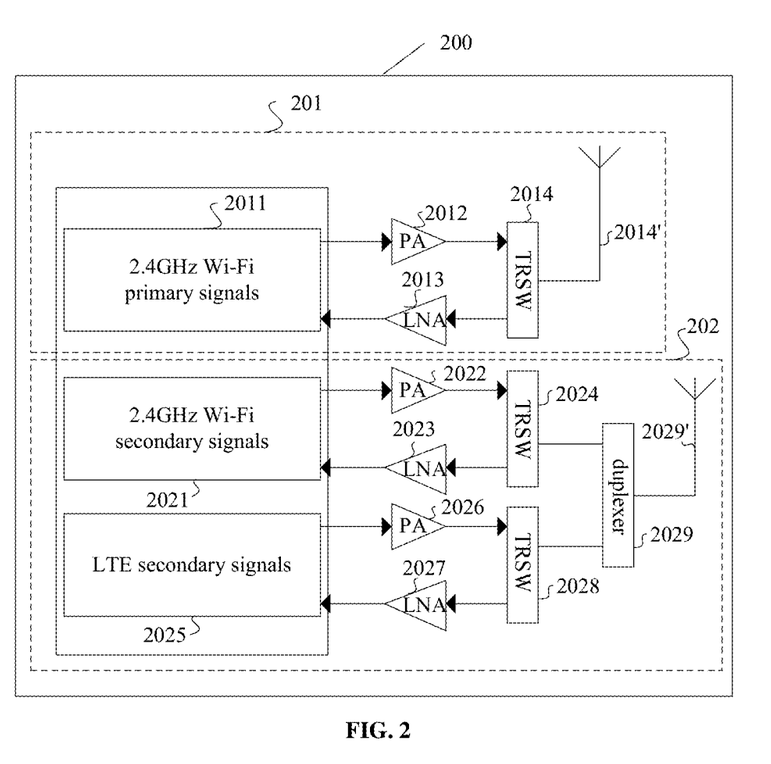
FIG. 2 is a structural diagram of a multi-radio frequency system according to an embodiment.

FIG. 2 is a structural diagram of a multi-radio frequency system according to an embodiment. Referring to FIG. 2, the multi-radio frequency system 200 may include an RF antenna 201 dedicated for 2.4 GHz Wi-Fi and an RF antenna 202 shared by 2.4 GHz Wi-Fi and LTE.

More specifically, the RF antenna 201 includes a 2.4 GHz Wi-Fi primary signal processing module (shown as 2.4 GHz Wi-Fi primary signals in FIG. 2) 2011, a Power Amplifier (PA) 2012, a Low Noise Amplifier (LNA) 2013, a Transceiver Switch (TRSW) 2014 and an antenna 2014'.

The RF antenna 202 includes a 2.4 GHz Wi-Fi secondary signal processing module (shown as 2.4 GHz Wi-Fi secondary signals in FIG. 2) 2021, a PA 2022, an LNA 2023, a TRSW 2024, an LTE secondary signal processing module (shown as LTE secondary signals in FIG. 2) 2025, a PA 2026, an LNA 2027, a TRSW 2028, a diplexer 2029 and an antenna 2029'.

It should be noted that in practice, the multi-radio frequency system 200 is not limited to the above embodiment. For example, it may be applied to a 5 GHz frequency band or other frequency bands, the number of shared RF antennas may be more than two, and the number of the non-shared RF antennas may also be more than two, which are not described in detail here.

In some embodiments, using the multi-radio frequency system 200, the data transmission method may include S101 and S102.

In S101, in at least a portion of a Wi-Fi time slice, if there is Wi-Fi data to be transmitted, the Wi-Fi data is transmitted using the shared RF antenna and the non-shared RF antenna.

In S102, in a non-Wi-Fi time slice, if there is Wi-Fi data to be transmitted, the Wi-Fi data is transmitted using the non-shared RF antenna.

In S101, in a portion of a Wi-Fi time slice, or in a single Wi-Fi time slice, or in several consecutive Wi-Fi time slices, if there is Wi-Fi data to be transmitted, the Wi-Fi device with the multi-radio frequency system may use the shared RF antenna and the non-shared RF antenna to form a MIMO antenna to transmit the Wi-Fi data. At this time, the Wi-Fi data transmission may be completed using MIMO technology in the Wi-Fi time slice.

In S102, in the non-Wi-Fi time slice, if there is Wi-Fi data to be transmitted, the Wi-Fi device may transmit the Wi-Fi data using the non-shared RF antenna. If the non-shared RF antenna includes multiple antennas, in the non-Wi-Fi time slice, the multiple non-shared RF antennas other than the shared RF antenna may be used to complete the Wi-Fi data transmission using the Wi-Fi technology.

Further, in the non-Wi-Fi time slice, the Wi-Fi device may use the shared RF antenna to transmit the non-Wi-Fi data. If the shared RF antenna includes multiple antennas, the non-Wi-Fi RF system may use MIMO technology to complete the non-Wi-Fi data transmission.

In some embodiments, to enable the transmitting and receiving Wi-Fi devices as both communicating parties to cooperate with each other to use the shared RF antenna or the non-shared RF antenna synchronously to transmit Wi-Fi data, the transmitting Wi-Fi device may generate an antenna transmission indication message in advance and send it to the receiving Wi-Fi device.

In some embodiments, before using the shared RF antenna and the non-shared RF antenna to transmit the Wi-Fi data, the transmitting Wi-Fi device may generate the antenna transmission indication message. Afterward, the non-shared RF antenna is used to send the antenna transmission indication message, so that the receiving Wi-Fi device determines which RF antenna is to be used for Wi-Fi data transmission based on the antenna transmission indication message.

The antenna transmission indication message may be used to indicate that the shared RF antenna and the non-shared RF antenna are used to transmit the Wi-Fi data in at least a portion of the Wi-Fi time slice.

In some embodiments, when the transmitting Wi-Fi device is in a non-Wi-Fi time slice (for example, the non-Wi-Fi time slice is about to time out), if the transmitting Wi-Fi device can transmit the antenna transmission indication message, the antenna transmission indication message may be transmitted. Based on the antenna transmission indication message, the receiving Wi-Fi device can be notified that in a next Wi-Fi time slice adjacent to the non-Wi-Fi time slice, if there is Wi-Fi data to be transmitted between the communicating parties, the shared RF antenna and the non-shared RF antenna are used to transmit and receive the Wi-Fi data.

In some embodiments, when the transmitting Wi-Fi device is in a Wi-Fi time slice (for example, at a moment close to a start time of the Wi-Fi time slice), if the transmitting Wi-Fi device can transmit the antenna transmission indication message, the antenna transmission indication message may be transmitted. Based on the antenna transmission indication message, the receiving Wi-Fi device can be notified that in the remaining time of the Wi-Fi time slice, if there is Wi-Fi data to be transmitted between the communicating parties, the shared RF antenna and the non-shared RF antenna are used to transmit and receive the Wi-Fi data.

In some embodiments, the antenna transmission indication message may be used to indicate that in the non-Wi-Fi time slice, the non-shared RF antenna is used to transmit the Wi-Fi data.

In some embodiments, when the transmitting Wi-Fi device is in a Wi-Fi time slice (for example, the Wi-Fi time slice is about to time out), if the transmitting Wi-Fi device can transmit the antenna transmission indication message, the antenna transmission indication message may be transmitted.

Based on the antenna transmission indication message, the receiving Wi-Fi device can be notified that in a next non-Wi-Fi time slice adjacent to the Wi-Fi time slice, if there is Wi-Fi data to be transmitted between the communicating parties, the non-shared RF antenna is used to transmit and receive the Wi-Fi data.

In some embodiments, the shared RF antenna may include a single RF antenna, and the non-shared RF antenna may include a single RF antenna. In this case, the multi-radio frequency system includes two RF antennas.

Under this condition, if conditions permit, the transmitting and receiving Wi-Fi devices may use MIMO technology to transmit the Wi-Fi data via the shared RF antenna and the non-shared RF antenna, or use SISO technology to transmit the Wi-Fi data via the non-shared RF antenna.

In some embodiments, even if the receiving Wi-Fi device adopts a standard protocol in the existing techniques, the transmitting Wi-Fi device may still notify the receiving Wi-Fi device, so that the receiving Wi-Fi device cooperates to perform MIMO transmission or SISO transmission.

In some embodiments, if the transmitting Wi-Fi device and the receiving Wi-Fi device use an Institute of Electrical and Electronics Engineers (IEEE) 802.11n standard protocol, a signaling exchange process may be performed based on exchange of Spatial Multiplexing Power Save (SMPS) management packets, so that the transmitting Wi-Fi device and the receiving Wi-Fi device perform SISO or MIMO switch based on information in the SMPS management packets.

In some embodiments, if the transmitting Wi-Fi device and the receiving Wi-Fi device use an IEEE 802.11ac standard protocol, a signaling exchange process may be performed based on exchange of Operation Mode Notification (OPMN) management packets, so that the transmitting Wi-Fi device and the receiving Wi-Fi device perform SISO or MIMO switch based on information in the OPMN management packets.

In some embodiments, if the transmitting Wi-Fi device and the receiving Wi-Fi device use an IEEE 802.11ax standard protocol, a signaling exchange process may be performed based on exchange of Transmission Operation Mode Indication (TOMI) management packets and exchange of Receive Operation Mode Indication (ROMI) management packets, so that the transmitting Wi-Fi device and the receiving Wi-Fi device perform SISO or MIMO switch based on information in the TOMI and/or ROMI management packets.

In some embodiments, if both the receiving Wi-Fi device and the transmitting Wi-Fi device adopt the technical solutions provided in the embodiments of the present disclosure, the receiving Wi-Fi device and the transmitting Wi-Fi device may cooperate with each other to perform MIMO transmission or SISO transmission.

In some embodiments, the receiving Wi-Fi device and the transmitting Wi-Fi device may perform the signaling exchange process by explicitly exchanging customized SISO switch management packets or MIMO switch management packets.

In some embodiments, the receiving Wi-Fi device and the transmitting Wi-Fi device may implicitly define a time slice allocation schedule to complete the signaling exchange process.

The time slice allocation schedule may specify a time slice and/or a time point at which the receiving Wi-Fi device and the transmitting Wi-Fi device need to switch to an RF antenna other than the shared RF antenna for data transmission and reception, and a time slice and/or a time point at which the receiving Wi-Fi device and the transmitting Wi-Fi device need to switch to all RF antennas including the shared RF antenna for data transmission and reception.

Further, based on the time slice allocation schedule, the receiving Wi-Fi device and the transmitting Wi-Fi device may use the shared RF antenna and the non-shared RF antenna, or use the non-shared RF antenna to transmit the Wi-Fi data.

In some embodiments, the receiving Wi-Fi device and the transmitting Wi-Fi device may determine the time slice allocation schedule through agreement or through negotiation in advance between the two communicating parties, so that the receiving Wi-Fi device and the transmitting Wi-Fi device may perform Wi-Fi data transmission and reception using less signaling exchange, i.e., following the time slice allocation schedule.

The time slice allocation schedule may include a first preset time period defined by one or more Wi-Fi time slices, and a second preset time period defined by one or more non-Wi-Fi time slices. The multiple Wi-Fi time slices refer to multiple consecutive Wi-Fi time slices after non-Wi-Fi time slices are not excluded. The multiple non-Wi-Fi time slices refer to multiple consecutive non-Wi-Fi time slices after Wi-Fi time slices are excluded.

In the first preset time period, the receiving Wi-Fi device and the transmitting Wi-Fi device may use the shared RF antenna and non-shared RF antenna to transmit the Wi-Fi data, and in the second preset time period, the receiving Wi-Fi device and the transmitting Wi-Fi device may use the non-shared RF antenna to transmit the Wi-Fi data.

For example, each of the receiving Wi-Fi device and the transmitting Wi-Fi device includes two RF antennas, one of which is a shared RF antenna, and the other is an RF antenna dedicated for Wi-Fi. Under this condition, the time slice allocation schedule may specify a time slice and/or a time point at which the receiving Wi-Fi device and the transmitting Wi-Fi device need to switch to the SISO operation mode, i.e., using the dedicated RF antenna other than the shared RF antenna for SISO data transmission and reception, and a time slice and/or a time point at which the receiving Wi-Fi device and the transmitting Wi-Fi device need to switch to the MIMO operation mode, i.e., using the shared RF antenna and the dedicated RF antenna for MIMO data transmission and reception.

If the transmitting and receiving Wi-Fi devices include two RF antennas, of which one is a dedicated Wi-Fi RF antenna, and the other is a shared RF antenna, the transmitting and receiving Wi-Fi device includes a multi-radio frequency system.

Figure 3:
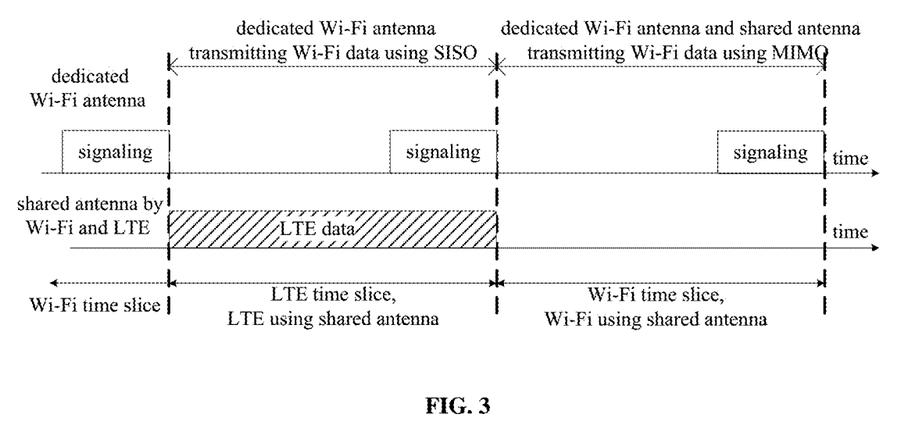
FIG. 3 is a diagram of transmitting Wi-Fi data and LTE data using a method according to an embodiment.

Under this condition, FIG. 3 is a diagram of transmitting Wi-Fi data and LTE data using a method according to an embodiment. Referring to FIG. 3, the multi-radio frequency system includes the multi-radio frequency system includes a Wi-Fi RF system and an LTE RF system, and both can use a shared RF antenna (the shared antenna shared by Wi-Fi and LTE in FIG. 3) to transmit Wi-Fi data and LTE data. The Wi-Fi RF system further includes a non-shared RF antenna (the dedicated Wi-Fi antenna shown in FIG. 3), which is used to form MIMO antennas for Wi-Fi data transmission.

Still referring to FIG. 3, time may be divided into time periods, and each time period includes a Wi-Fi time slice and an LTE time slice. In the LTE time slice (that is, the non-Wi-Fi time slice), the LTE system usually uses the shared RF antenna to transmit LTE data, and in the Wi-Fi time slice, the Wi-Fi data can be transmitted after channel competition is successful and a channel utilization right is acquired.

Still referring to FIG. 3, when the Wi-Fi time slice approaches the end, the transmitting Wi-Fi device may send signaling (for example, the antenna transmission indication message (not shown)) on the dedicated Wi-Fi antenna to initiate a signaling exchange process. The signaling may notify the receiving Wi-Fi device to switch Wi-Fi data packets transmitted between the transmitting Wi-Fi device and the receiving Wi-Fi device to the SISO operation mode, so that the transmitting Wi-Fi device and the receiving Wi-Fi device can use the dedicated Wi-Fi antenna in a next LTE time slice adjacent to the Wi-Fi time slice to perform Wi-Fi data exchange in an SISO mode.

Afterward, when the next LTE time slice arrives, the transmitting Wi-Fi device and the receiving Wi-Fi device may use the dedicated Wi-Fi antenna to transmit Wi-Fi data (not shown). At the same time, in the next LTE time slice, the shared RF antenna is used to transmit LTE data for being used by the LTE RF system.

At the end of the next LTE time slice, the transmitting Wi-Fi device may send signaling (for example, the antenna transmission indication message (not shown)) on the dedicated Wi-Fi antenna to initiate a signaling exchange process. The signaling may notify the receiving Wi-Fi device to switch the Wi-Fi data packets transmitted between the transmitting Wi-Fi device and the receiving Wi-Fi device to the MIMO operation mode, so that the transmitting Wi-Fi device and the receiving Wi-Fi device may use the dedicated Wi-Fi RF antenna and the shared RF antenna to form MIMO antennas in a next Wi-Fi time slice for Wi-Fi data exchange (Wi-Fi data packets are not shown in FIG. 3).

It should be noted that in practical transmission, as Wi-Fi data packets may be relatively large, when the dedicated Wi-Fi antenna is used for transmission in an LTE time slice, Wi-Fi data packets transmitted in the SISO mode may exceed the LTE time slice, and enter a next Wi-Fi time slice adjacent to the LTE time slice.

After the Wi-Fi data packets are exchanged, the transmitting Wi-Fi device may notify the receiving Wi-Fi device to switch to MIMO through the dedicated Wi-Fi antenna within the Wi-Fi time slice, and to transmit Wi-Fi data packets using MIMO technology in the remaining time of the Wi-Fi time slice. In short, the transmitting Wi-Fi device may initiate a signaling exchange process (not shown in FIG. 3) to the receiving Wi-Fi device at any time based on the dedicated Wi-Fi antenna.

For example, at the beginning of the Wi-Fi time slice, the transmitting Wi-Fi device may initiate a signaling exchange process on the dedicated Wi-Fi antenna, to notify the receiving Wi-Fi device to switch the Wi-Fi data packet exchange between the two communicating parties to the MIMO operation mode, so that the transmitting Wi-Fi device can use two antennas to form MIMO antennas and perform Wi-Fi data packet exchange with the receiving Wi-Fi device. In this case, the shared RF antenna shared by Wi-Fi and LTE is used by the Wi-Fi RF system.

From above, in the embodiments of the present disclosure, a Wi-Fi device with a multi-radio frequency system initiates a signaling exchange process to a remote Wi-Fi device to notify the remote Wi-Fi device to use a MIMO or SISO operation mode to perform Wi-Fi data transmission, which enables the non-shared RF antenna to operate in various time periods, thereby improving Wi-Fi transmission efficiency and optimizing transmission performance of the Wi-Fi system without interfering the data transmission process of the non-Wi-Fi system. In this way, coexistence of different RF systems is realized, and overall performance of the multi-radio frequency system is improved.

Figure 4:
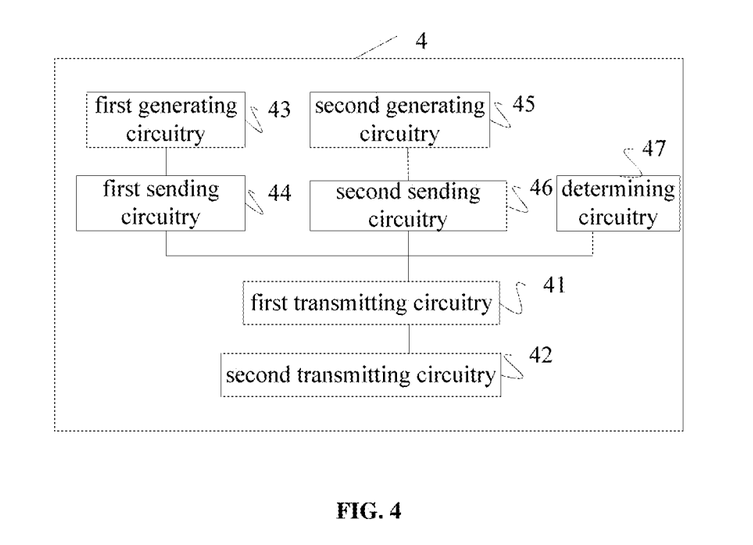
FIG. 4 is a structural diagram of a data transmission device for a multi-radio frequency system according to an embodiment.

FIG. 4 is a structural diagram of a data transmission device for a multi-radio frequency system according to an embodiment. The data transmission device 4 for the multi-radio frequency system may perform the method as shown in FIGS. 1 to 3.

The multi-radio frequency system includes a shared RF antenna and a non-shared RF antenna, the shared RF antenna is configured to transmit Wi-Fi data and non-Wi-Fi data, the non-shared RF antenna is configured to transmit the Wi-Fi data, and the data transmission device 4 includes: a first transmission circuitry 41 configured to: in at least a portion of a Wi-Fi time slice, if there is Wi-Fi data to be transmitted, transmit the Wi-Fi data using the shared RF antenna and the non-shared RF antenna; and a second transmission circuitry 42 configured to: in a non-Wi-Fi time slice, if there is Wi-Fi data to be transmitted, transmit the Wi-Fi data using the non-shared RF antenna.

In some embodiments, the data transmission device 4 further includes: a first generating circuitry 43 configured to: before the Wi-Fi data is transmitted using the shared RF antenna and the non-shared RF antenna, generate an antenna transmission indication message, where the antenna transmission indication message indicates transmitting the Wi-Fi data using the shared RF antenna and the non-shared RF antenna in at least the portion of the Wi-Fi time slice; and a first sending circuitry 44 configured to send the antenna transmission indication message, so that a receiving device receives the Wi-Fi data using the shared RF antenna and non-shared RF antenna indicated in the antenna transmission indication message.

In some embodiments, the data transmission device 4 further includes: a second generating circuitry 45 configured to: before the Wi-Fi data is transmitted using the non-shared RF antenna, generate an antenna transmission indication message, where the antenna transmission indication message indicates transmitting the Wi-Fi data using the non-shared RF antenna in the non-Wi-Fi time slice; and a second sending circuitry 46 configured to send the antenna transmission indication message, so that a receiving device receives the Wi-Fi data using the non-shared RF antenna indicated in the antenna transmission indication message.

In some embodiments, the first sending circuitry 44 and the second sending circuitry 46 may send the antenna transmission indication message using the non-shared RF antenna.

In some embodiments, RF antennas of the multi-radio frequency system and the receiving device are in compliance with IEEE 802.11n protocol specifications, and the antenna transmission indication message is transmitted through an SMPS management packet.

In some embodiments, RF antennas of the multi-radio frequency system and the receiving device are in compliance with IEEE 802.11ac protocol specifications, and the antenna transmission indication message is transmitted through an OPMN management packet.

In some embodiments, RF antennas of the multi-radio frequency system and the receiving device are in compliance with IEEE 802.11ax protocol specifications, and the antenna transmission indication message is transmitted through a TOMI management packet and/or a ROMI management packet.

In some embodiments, the data transmission device 4 further includes a determining circuitry 47 configured to: before the Wi-Fi data is transmitted using the shared RF antenna and the non-shared RF antenna, determine a time slice allocation schedule, so that the at least the portion of the Wi-Fi time slice and the non-Wi-Fi time slice are determined according to the time slice allocation schedule.

In some embodiments, the non-shared RF antenna includes a single RF antenna, the shared RF antenna includes a single RF antenna, the first transmission circuitry 41 is configured to transmit the Wi-Fi data using the shared RF antenna and the non-shared RF antenna based on MIMO technology, and the second transmission circuitry 42 is configured to transmit the Wi-Fi data using the non-shared RF antenna based on SISO technology.

More details about working principles and working modes of the data transmission device 4 shown in FIG. 4 may be referred to the above description of FIGS. 1 to 3, and are not described here.

Embodiments of the present disclosure further provide a storage medium having computer instructions stored thereon, wherein once the computer instructions are executed, the above method as shown in FIGS. 1 to 3 is performed. In some embodiments, the storage medium may include a computer readable storage medium which may be a Read Only Memory (ROM), a Random Access Memory (RAM), a magnetic disk or an optical disk.

Embodiments of the present disclosure further provide a terminal including a memory and a processor, wherein the memory has computer instructions stored thereon, and once the processor executes the computer instructions, the above method as shown in FIGS. 1 to 3 is performed. In some embodiments, the terminal may be a user equipment that multiplexes a same RF antenna for Wi-Fi data transmission and LTE data transmission.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A data transmission method for a multi-radio frequency system, wherein the multi-radio frequency system comprises a shared radio frequency antenna and a non-shared radio frequency antenna, the shared radio frequency antenna is configured to transmit Wi-Fi data and non-Wi-Fi data, the non-shared radio frequency antenna is configured to transmit the Wi-Fi data, and the method comprises:

in at least a portion of a Wi-Fi time slice, transmitting Wi-Fi data to be transmitted using the shared radio frequency antenna and the non-shared radio frequency antenna; and in a non-Wi-Fi time slice, transmitting Wi-Fi data to be transmitted using the non-shared radio frequency antenna, wherein before transmitting the Wi-Fi data using the non-shared radio frequency antenna, the method further comprises:

generating a first antenna transmission indication message, where the first antenna transmission indication message indicates transmitting the Wi-Fi data using the non-shared radio frequency antenna in the non-Wi-Fi time slice; and sending the first antenna transmission indication message, so that a receiving device receives the Wi-Fi data using the non-shared radio frequency antenna indicated in the first antenna transmission indication message.

2. The data transmission method according to claim 1, wherein before transmitting the Wi-Fi data using the shared radio frequency antenna and the non-shared radio frequency antenna, the method further comprises:

generating a second antenna transmission indication message, where the second antenna transmission indication message indicates transmitting the Wi-Fi data using the shared radio frequency antenna and the non-shared radio frequency antenna in at least the portion of the Wi-Fi time slice; and sending the second antenna transmission indication message, so that a receiving device receives the Wi-Fi data using the shared radio frequency antenna and non-shared radio frequency antenna indicated in the second antenna transmission indication message.

3. The data transmission method according to claim 2, wherein sending the second antenna transmission indication message comprises:

sending the second antenna transmission indication message using the non-shared radio frequency antenna.

4. The data transmission method according to claim 2, wherein radio frequency antennas of the multi-radio frequency system and the receiving device are in compliance with Institute of Electrical and Electronics Engineers (IEEE) 802.11n protocol specifications, and the second antenna transmission indication message is transmitted through a Spatial Multiplexing Power Save (SMPS) management packet.

5. The data transmission method according to claim 2, wherein radio frequency antennas of the multi-radio frequency system and the receiving device are in compliance with IEEE 802.11ac protocol specifications, and the second antenna transmission indication message is transmitted through an Operation Mode Notification (OPMN) management packet.

6. The data transmission method according to claim 2, wherein radio frequency antennas of the multi-radio frequency system and the receiving device are in compliance with IEEE 802.11ax protocol specifications, and the second antenna transmission indication message is transmitted through a Transmission Operation Mode Indication (TOMI) management packet and/or a Receive Operation Mode Indication (ROMI) management packet.

7. The data transmission method according to claim 2, wherein the non-shared radio frequency antenna comprises a single radio frequency antenna, the shared radio frequency antenna comprises a single radio frequency antenna, transmitting the Wi-Fi data using the shared radio frequency antenna and the non-shared radio frequency antenna comprises: transmitting the Wi-Fi data using the shared radio frequency antenna and the non-shared radio frequency antenna based on MIMO technology, and transmitting the Wi-Fi data using the non-shared radio frequency antenna comprises: transmitting the Wi-Fi data using the non-shared radio frequency antenna based on SISO technology.

8. The data transmission method according to claim 1, wherein before transmitting the Wi-Fi data using the shared radio frequency antenna and the non-shared radio frequency antenna, the method further comprises:

determining a time slice allocation schedule, so that the at least the portion of the Wi-Fi time slice and the non-Wi-Fi time slice are determined according to the time slice allocation schedule.

9. The data transmission method according to claim 8, wherein the non-shared radio frequency antenna comprises a single radio frequency antenna, the shared radio frequency antenna comprises a single radio frequency antenna, transmitting the Wi-Fi data using the shared radio frequency antenna and the non-shared radio frequency antenna comprises: transmitting the Wi-Fi data using the shared radio frequency antenna and the non-shared radio frequency antenna based on MIMO technology, and transmitting the Wi-Fi data using the non-shared radio frequency antenna comprises: transmitting the Wi-Fi data using the non-shared radio frequency antenna based on SISO technology.

10. The data transmission method according to claim 1, wherein the non-shared radio frequency antenna comprises a single radio frequency antenna, the shared radio frequency antenna comprises a single radio frequency antenna, transmitting the Wi-Fi data using the shared radio frequency antenna and the non-shared radio frequency antenna comprises: transmitting the Wi-Fi data using the shared radio frequency antenna and the non-shared radio frequency antenna based on Multiple Input Multiple Output (MIMO) technology, and transmitting the Wi-Fi data using the non-shared radio frequency antenna comprises: transmitting the Wi-Fi data using the non-shared radio frequency antenna based on Single Input Single Output (SISO) technology.

11. A non-transitory storage medium having computer instructions stored thereon, wherein once the computer instructions are executed, the method according to claim 1 is performed.

12. A terminal comprising a memory and a processor, wherein the memory has computer instructions stored thereon, and once the processor executes the computer instructions, the method according to claim 1 is performed.

13. The data transmission method according to claim 1, wherein sending the first antenna transmission indication message comprises:

sending the first antenna transmission indication message using the non-shared radio frequency antenna.

14. The data transmission method according to claim 1, wherein radio frequency antennas of the multi-radio frequency system and the receiving device are in compliance with Institute of IEEE 802.11n protocol specifications, and the first antenna transmission indication message is transmitted through an SMPS management packet.

15. The data transmission method according to claim 1, wherein radio frequency antennas of the multi-radio frequency system and the receiving device are in compliance with IEEE 802.11ac protocol specifications, and the first antenna transmission indication message is transmitted through an OPMN management packet.

16. The data transmission method according to claim 1, wherein radio frequency antennas of the multi-radio frequency system and the receiving device are in compliance with IEEE 802.11ax protocol specifications, and the first antenna transmission indication message is transmitted through a TOMI management packet and/or a ROMI management packet.

17. The data transmission method according to claim 1, wherein the non-shared radio frequency antenna comprises a single radio frequency antenna, the shared radio frequency antenna comprises a single radio frequency antenna, transmitting the Wi-Fi data using the shared radio frequency antenna and the non-shared radio frequency antenna comprises: transmitting the Wi-Fi data using the shared radio frequency antenna and the non-shared radio frequency antenna based on MIMO technology, and transmitting the Wi-Fi data using the non-shared radio frequency antenna comprises: transmitting the Wi-Fi data using the non-shared radio frequency antenna based on SISO technology.

18. A data transmission device for a multi-radio frequency system, wherein the multi-radio frequency system comprises a shared radio frequency antenna and a non-shared radio frequency antenna, the shared radio frequency antenna is configured to transmit Wi-Fi data and non-Wi-Fi data, the non-shared radio frequency antenna is configured to transmit the Wi-Fi data, and the data transmission device comprises:

a first transmission circuitry configured to: in at least a portion of a Wi-Fi time slice, transmit Wi-Fi data to be transmitted using the shared radio frequency antenna and the non-shared radio frequency antenna;

a second transmission circuitry configured to: in a non-Wi-Fi time slice, transmit Wi-Fi data to be transmitted using the non-shared radio frequency antenna;

a second generating circuitry configured to: before the Wi-Fi data is transmitted using the non-shared radio frequency antenna, generate an antenna transmission indication message, where the antenna transmission indication message indicates transmitting the Wi-Fi data using the non-shared radio frequency antenna in the non-Wi-Fi time slice; and a second sending circuitry configured to send the antenna transmission indication message, so that a receiving device receives the Wi-Fi data using the non-shared radio frequency antenna indicated in the antenna transmission indication message.

* * * * *